(12) United States Patent
Mutert

(10) Patent No.: US 7,032,868 B2
(45) Date of Patent: Apr. 25, 2006

(54) BAG STAND

(75) Inventor: George Mutert, Belvedere, IL (US)

(73) Assignee: Resourceful Bag & Tag, Inc., Palos Heights, IL (US)

( * ) Notice: Subject to any disclaimer, the term of this patent is extended or adjusted under 35 U.S.C. 154(b) by 0 days.

(21) Appl. No.: 10/965,619

(22) Filed: Oct. 14, 2004

(65) Prior Publication Data

US 2005/0077438 A1    Apr. 14, 2005

Related U.S. Application Data

(60) Provisional application No. 60/510,998, filed on Oct. 14, 2003.

(51) Int. Cl.
*B65B 67/04* (2006.01)

(52) U.S. Cl. ......................... 248/99; 141/391

(58) Field of Classification Search .................. 248/99, 248/100, 95, 97; 141/390, 391; 220/495.08; 16/227; 211/200
See application file for complete search history.

(56) References Cited

U.S. PATENT DOCUMENTS

| 63,383 | A | | 4/1867 | Hanks | |
|---|---|---|---|---|---|
| 100,123 | A | | 2/1870 | Crofoot | |
| 102,616 | A | | 5/1870 | Sweigert | |
| 447,686 | A | | 3/1891 | Holladay | |
| 653,035 | A | | 7/1900 | Noble | |
| 1,022,862 | A | | 4/1912 | McMillen | |
| 2,470,977 | A | | 5/1949 | Chidsey | 248/97 |
| 3,502,291 | A | | 3/1970 | Ackerman et al. | 248/97 |
| 3,659,816 | A | | 5/1972 | Wilson | 248/97 |
| 3,948,474 | A | * | 4/1976 | Pomroy | 248/99 |
| 4,593,873 | A | * | 6/1986 | Nelson | 248/98 |
| 4,613,104 | A | | 9/1986 | Garrott | 248/97 |
| 4,697,771 | A | * | 10/1987 | Majors | 248/97 |
| 4,711,367 | A | * | 12/1987 | Albertson | 229/117.12 |
| 4,723,741 | A | * | 2/1988 | Doering | 248/97 |
| 4,793,628 | A | * | 12/1988 | Haley, Sr. | 280/641 |
| 4,953,815 | A | | 9/1990 | Beymer | 248/97 |
| 5,360,189 | A | | 11/1994 | Hart | 248/97 |
| 5,411,229 | A | | 5/1995 | Hoefkes | 248/97 |
| 5,570,862 | A | | 11/1996 | Nugent | 248/97 |
| 5,799,908 | A | | 9/1998 | Downs | 248/97 |
| 6,076,782 | A | | 6/2000 | Alderman | 248/97 |
| 6,116,549 | A | | 9/2000 | Santa Cruz | 248/97 |
| 6,334,593 | B1 | | 1/2002 | Inoue | 248/95 |
| 6,491,264 | B1 | | 12/2002 | Valesquez | 248/97 |
| D468,138 | S | | 1/2003 | Briggs | D6/496 |

(Continued)

*Primary Examiner*—Ramon O Ramirez
(74) *Attorney, Agent, or Firm*—Howard & Howard

(57) ABSTRACT

The invention is an apparatus having first and second legs pivotable with respect one another about a pivot axis. The first and second legs pivot between a first position and a second position. In the first position, the first and second legs are substantially aligned with respect to one another and can be stored. In the second position, the first and second legs are transverse with respect to one another and can receive a bag. The apparatus also includes first and second incurvate portions defined by each of the first and second legs. The first and second incurvate portions are spaced from the pivot axis and from each other. The apparatus also includes first and second excurvate portions defined by each of the first and second legs. The first and second excurvate portions are substantially coplanar with the first and second incurvate portions of the respective leg and are spaced from said pivot axis and from each other. An opening of a bag can be received at the first and second excurvate portions and supported during filling.

23 Claims, 8 Drawing Sheets

U.S. PATENT DOCUMENTS

| | | | |
|---|---|---|---|
| D468,563 S | 1/2003 | Briggs | D6/496 |
| 6,508,443 B1 | 1/2003 | Andreasson | 248/97 |
| 6,511,026 B1 | 1/2003 | Hatfield | 248/97 |
| D471,082 S | 3/2003 | Scola | D8/373 |
| 6,705,575 B1 * | 3/2004 | Hoy | 248/99 |
| 2002/0104932 A1 | 8/2002 | Johnston | 248/97 |

* cited by examiner

BAG STAND

CROSS REFERENCE TO RELATED APPLICATIONS

This application claims the benefit of U.S. provisional patent application Ser. No. 60/510,998 for a BAG STAND FOR USE IN A REFUSE CONTAINER ASSEMBLY AND METHOD FOR ASSEMBLING SAME, filed on Oct. 14, 2003, which is hereby incorporated by reference in its entirety. This claim is made under 35 U.S.C. § 119(e); 37 C.F.R. § 1.78; and 65 Fed. Reg. 50093.

FIELD OF THE INVENTION

The invention generally relates to a stand for supporting a bag during filling of the bag and more specifically the invention relates to a collapsible bag stand having pivotably interconnected legs and structure for maintaining a bag in place during filling.

BACKGROUND OF THE INVENTION

Portable refuse and recycling containers are well known in the art. Typical containers consist of wheeled carts formed from PVC or another suitable polymeric material. Such carts are cumbersome to move, difficult to empty and must be thoroughly rinsed after each use. Various bins and barrels are also used for collecting and storing recyclable materials; however, such containers typically have rigid, opaque sides that conceal the contents of the containers, thus increasing the likelihood that refuse and recyclable materials will be inadvertently deposited and mixed together within a single container.

While containers exist which are intended for use with disposable plastic bags, such containers are not designed to permit simple installation and removal of the bags therefrom. To the contrary, the components used in such containers often fail to effectively engage the bags or maintain the bags in a stationary position relative thereto. Because the bags are inadequately secured to the containers, the bags tend to rip away from the containers soon after the bags begin to fill with recycled materials. Such containers are also difficult and time consuming to assemble and distribute, which makes them unsuitable for use at special events or other large scale public gatherings.

SUMMARY OF THE INVENTION

The invention includes an apparatus having first and second legs pivotable with respect one another about a pivot axis. The first and second legs pivot between a first position and a second position. In the first position, the first and second legs are substantially aligned with respect to one another and can be stored. In the second position, the first and second legs are transverse with respect to one another and can receive a bag. The apparatus also includes first and second incurvate portions defined by each of the first and second legs. The first and second incurvate portions are spaced from the pivot axis and from each other. The apparatus also includes first and second excurvate portions defined by each of the first and second legs. The first and second excurvate portions are substantially coplanar with the first and second incurvate portions of the respective leg and are spaced from said pivot axis and from each other. An opening of a bag can be received at the first and second excurvate portions and supported during filling.

The application also provides a second apparatus having first and second legs pivotable with respect one another about a pivot axis. The first and second legs pivot between a first position and a second position. In the first position, the first and second legs are substantially aligned with respect to one another and can be stored. In the second position, the first and second legs are transverse with respect to one another and can receive a bag. The second apparatus also includes first and second hinge members pivotally engaging the first and second legs with respect to one another. Each of the first and second hinge members including an elongate wire member fixedly engaged with one of the first and second legs and substantially encircling the other of the first and second legs. Each of the first and second hinge members also includes a washer member rotatably encircling the elongate wire member and fixedly associated with the other of said first and second legs.

The application also provides a third apparatus having a bail extending a length between a first and second ends. The bail defines first and second incurvate portions spaced from each other. The bail also defines first and second excurvate portions substantially coplanar with the first and second incurvate portions. The first and second excurvate portions are spaced from each other. The third apparatus also includes a frame member fixedly engaged with said bail and defining a plurality of apertures. Fasteners can be inserted in the plurality of apertures to connect the frame member and bail to another structure, such as a refuse can.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE EXEMPLARY EMBODIMENT

Figure 1:
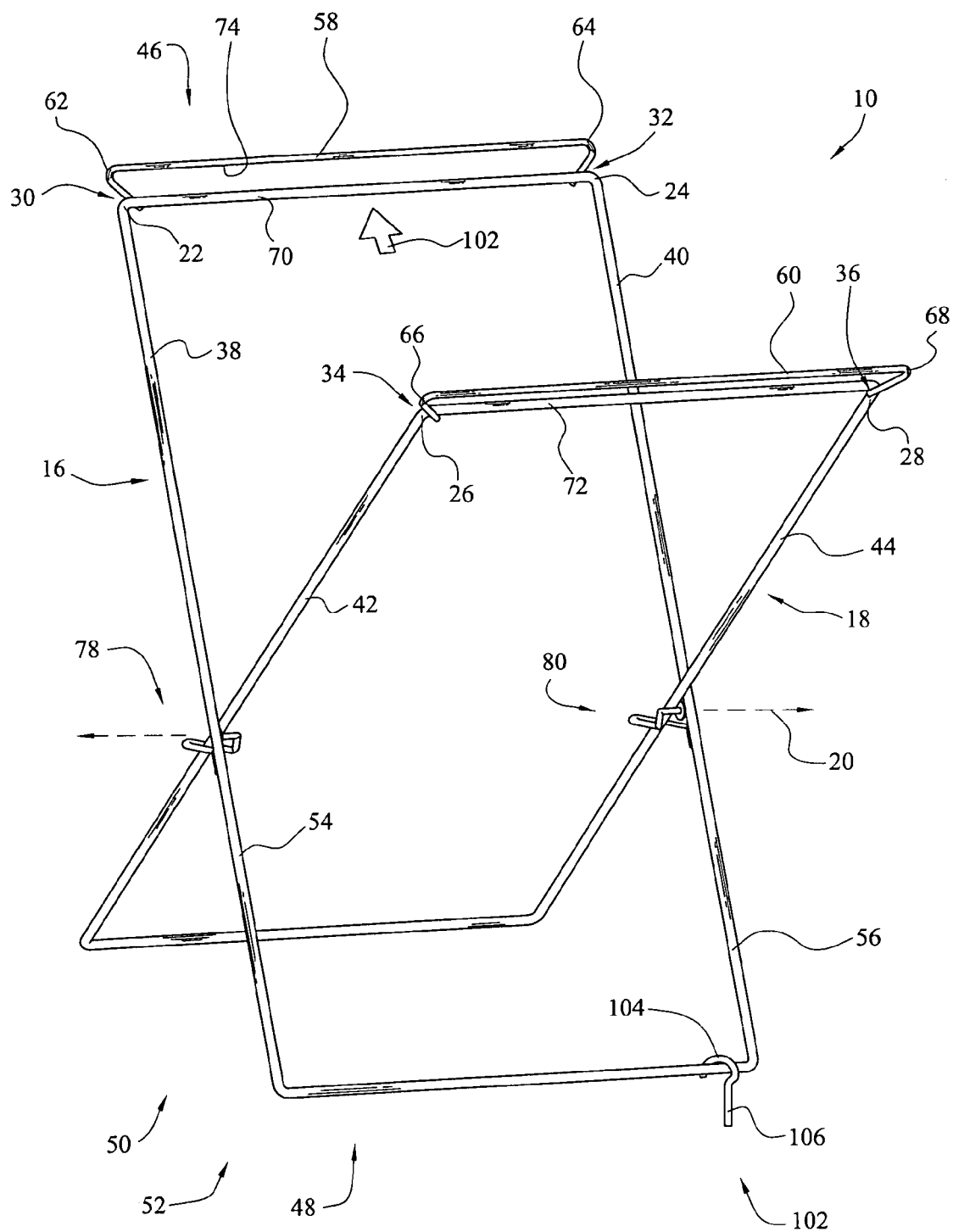
FIG. 1 is a perspective view of a bag stand according to a first embodiment of the invention.

A plurality of different embodiments of the invention are shown in the Figures of the application. Similar features are shown in the various embodiments of the invention. Similar features have been numbered with a common reference numeral and have been differentiated by an alphabetic designation. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Figure 2:
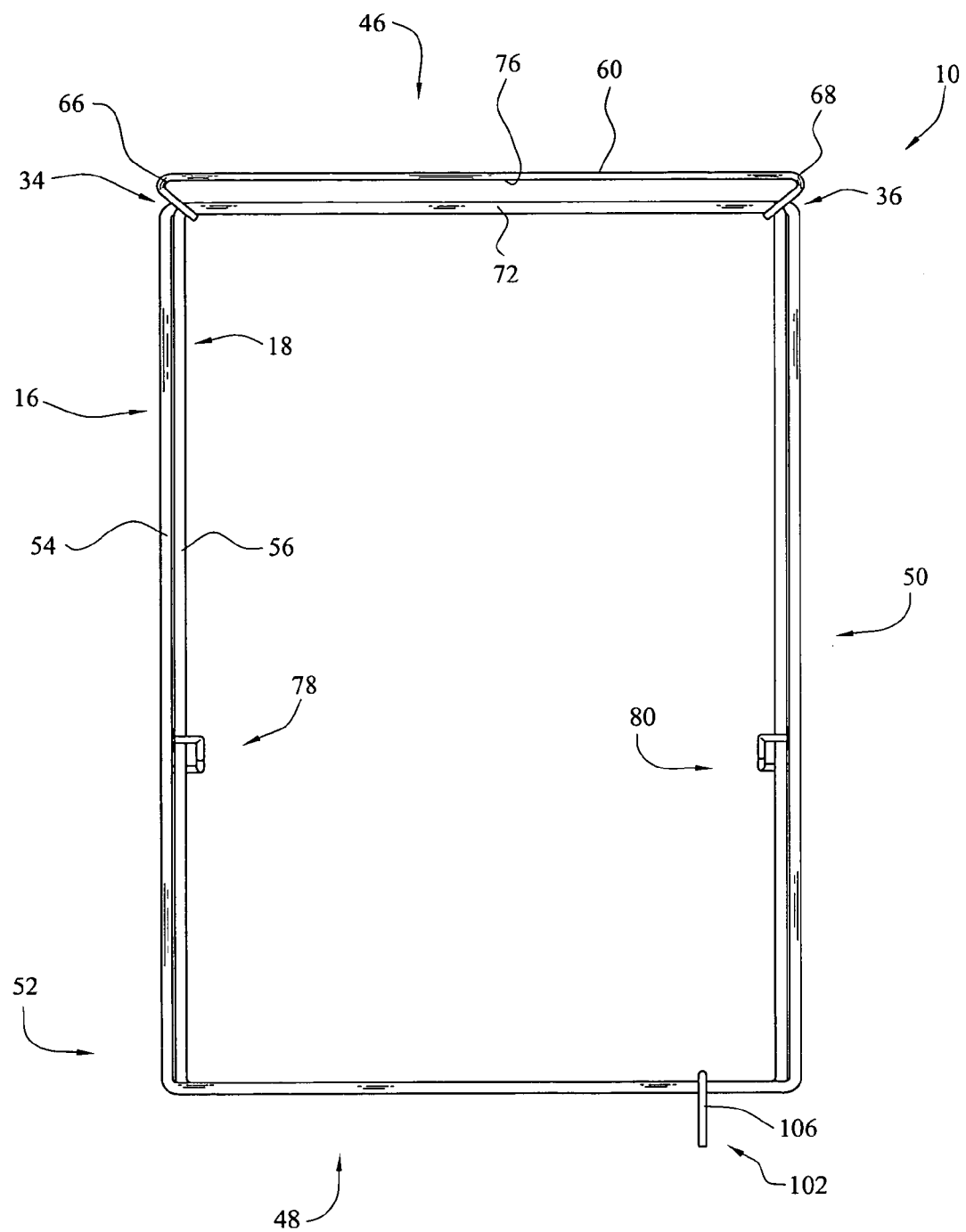
FIG. 2 is a right side view of the first embodiment.
Figure 3:
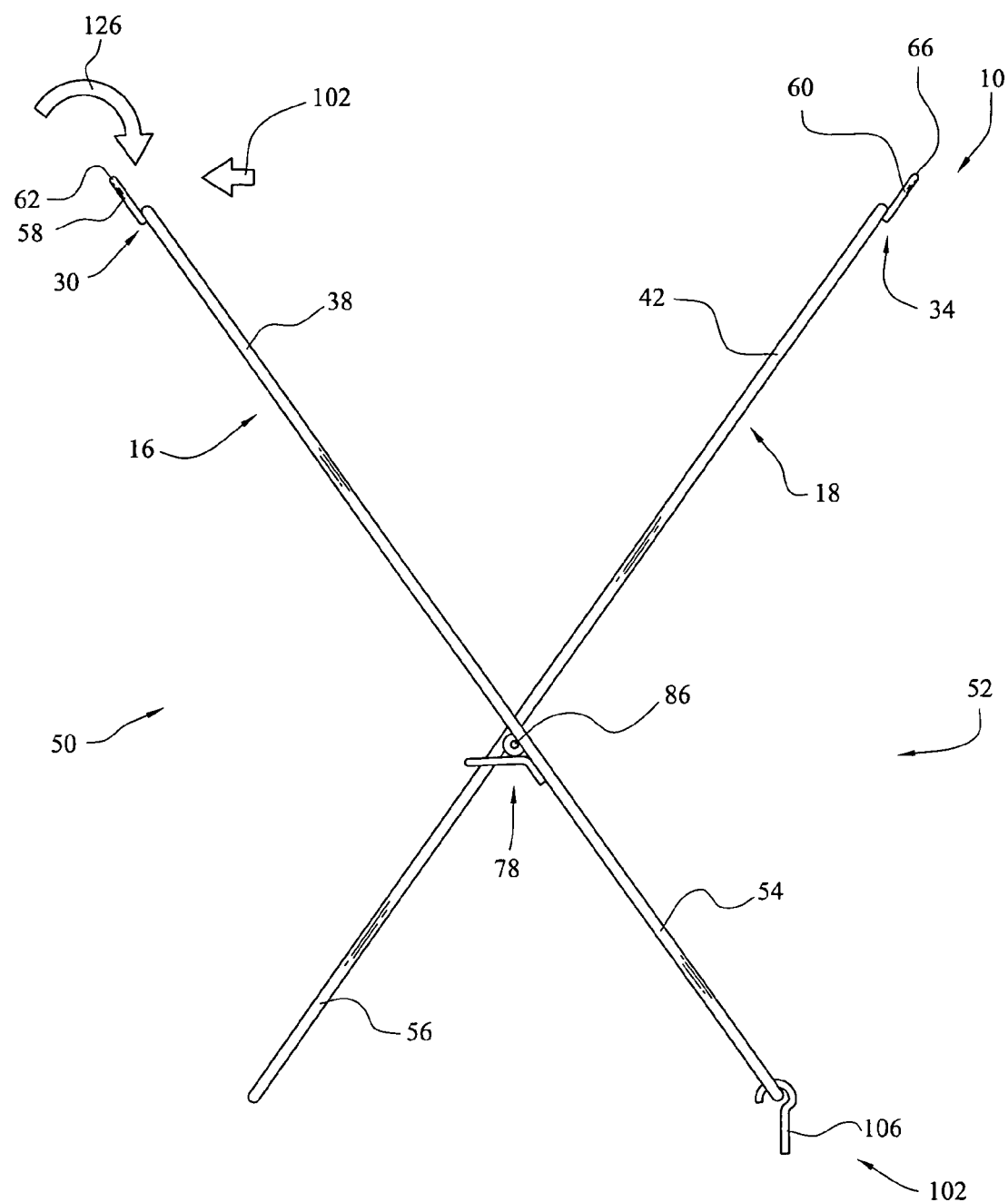
FIG. 3 is a front view of the first embodiment.
Figure 4:
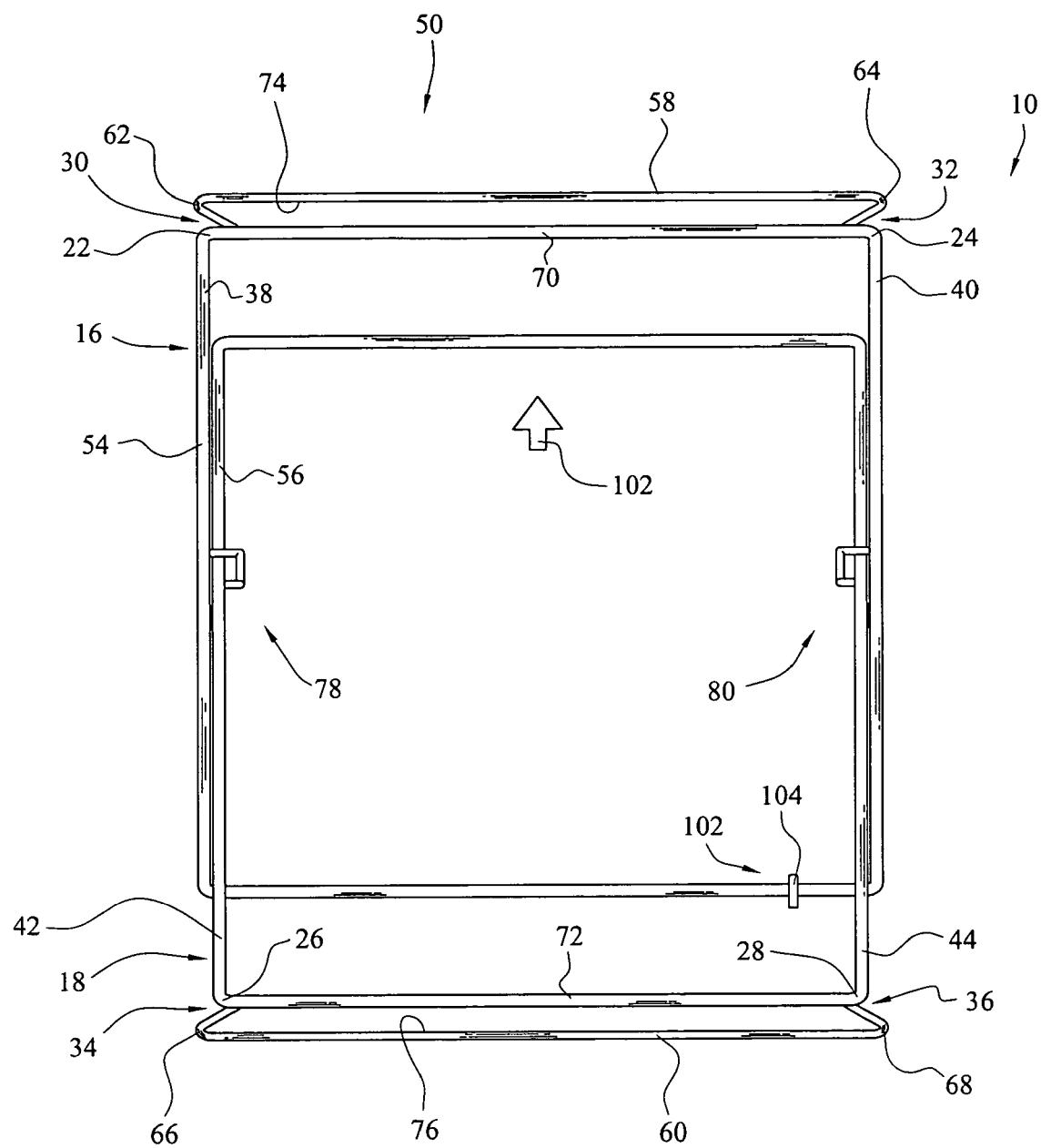
FIG. 4 is a top view of the first embodiment.
Figure 5:
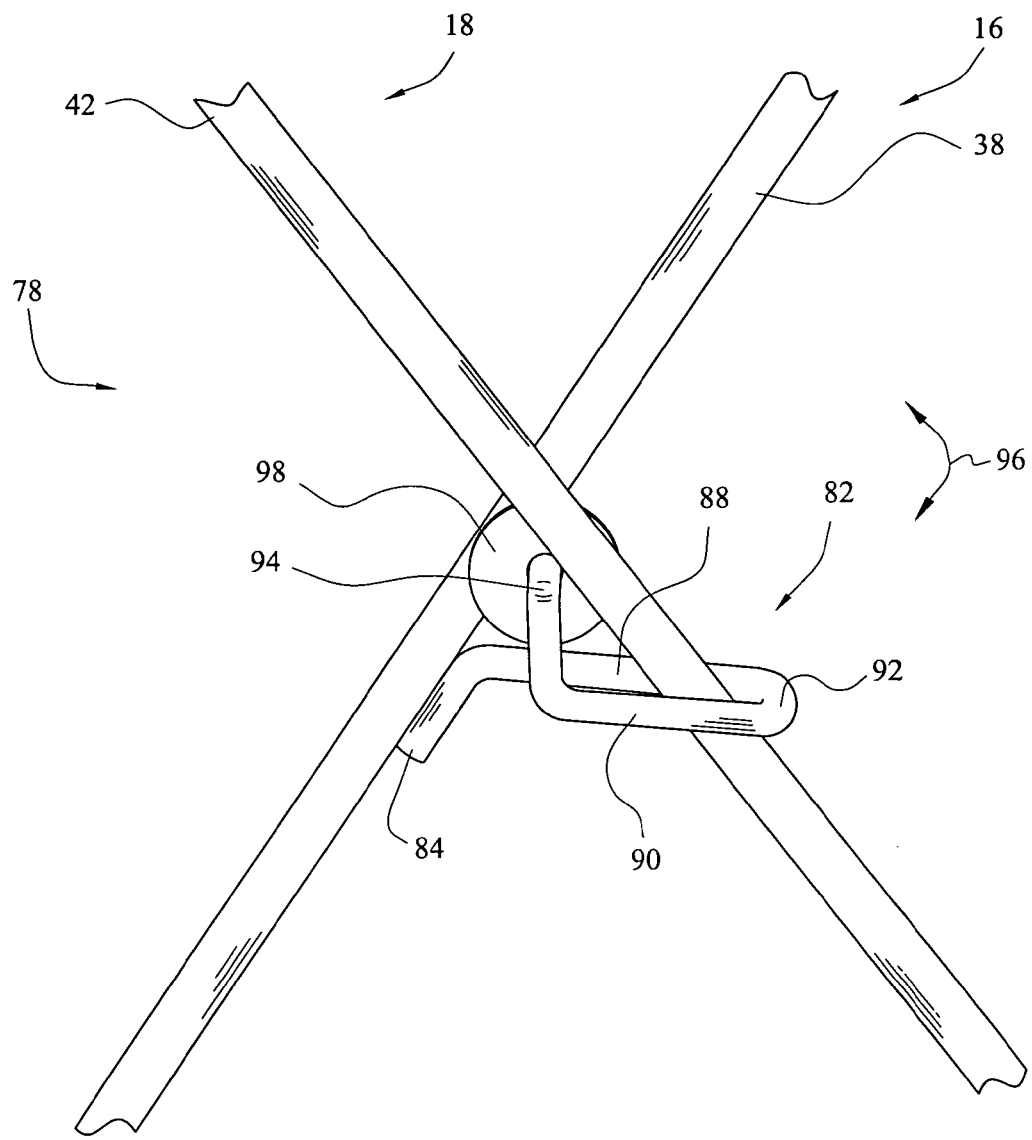
FIG. 5 is an enlarged side view of a hinge member of the first embodiment.
Figure 6:
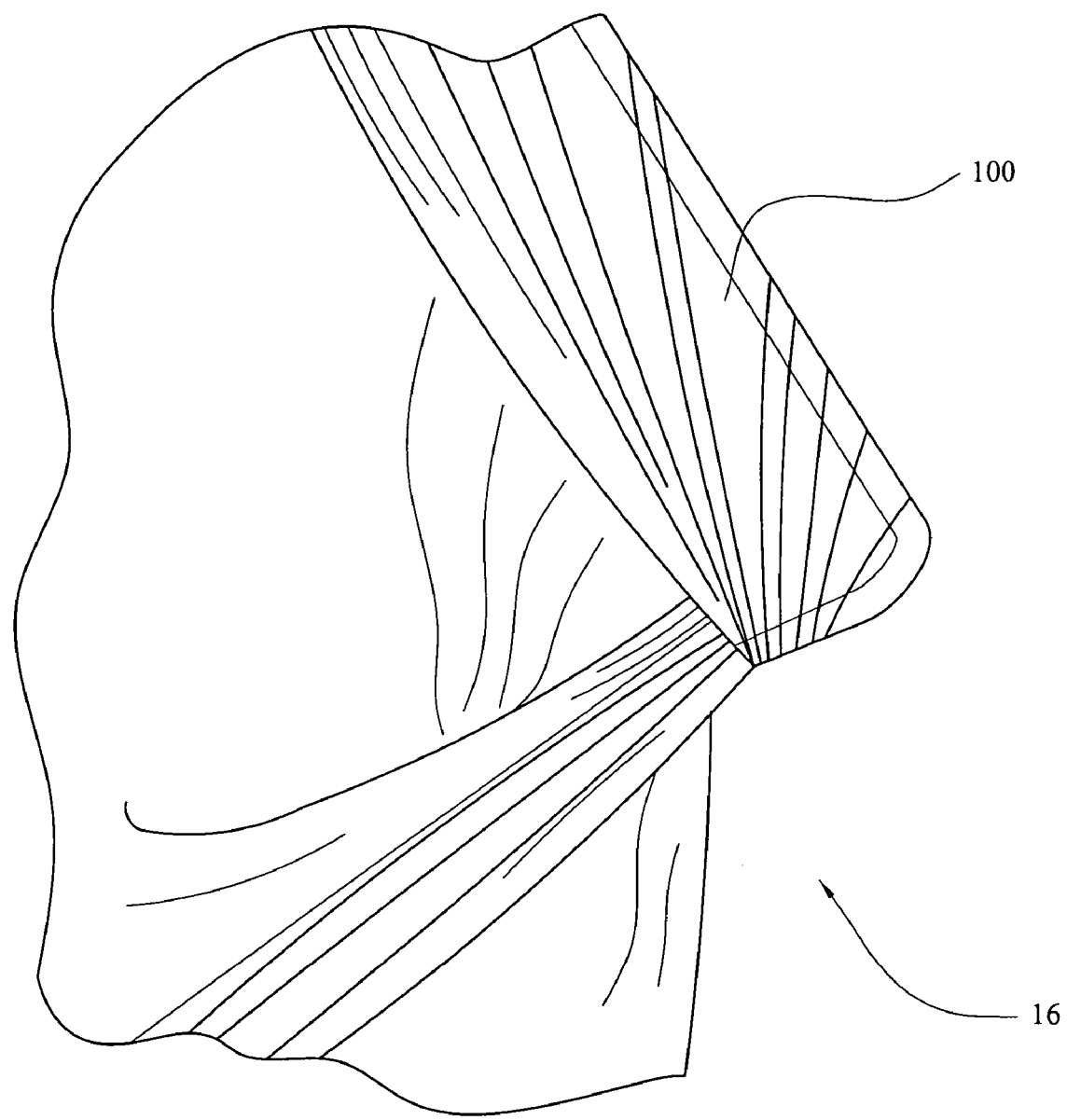
FIGS. 6 is a perspective view of a bag being supported at one corner of the first embodiment.
Figure 7:
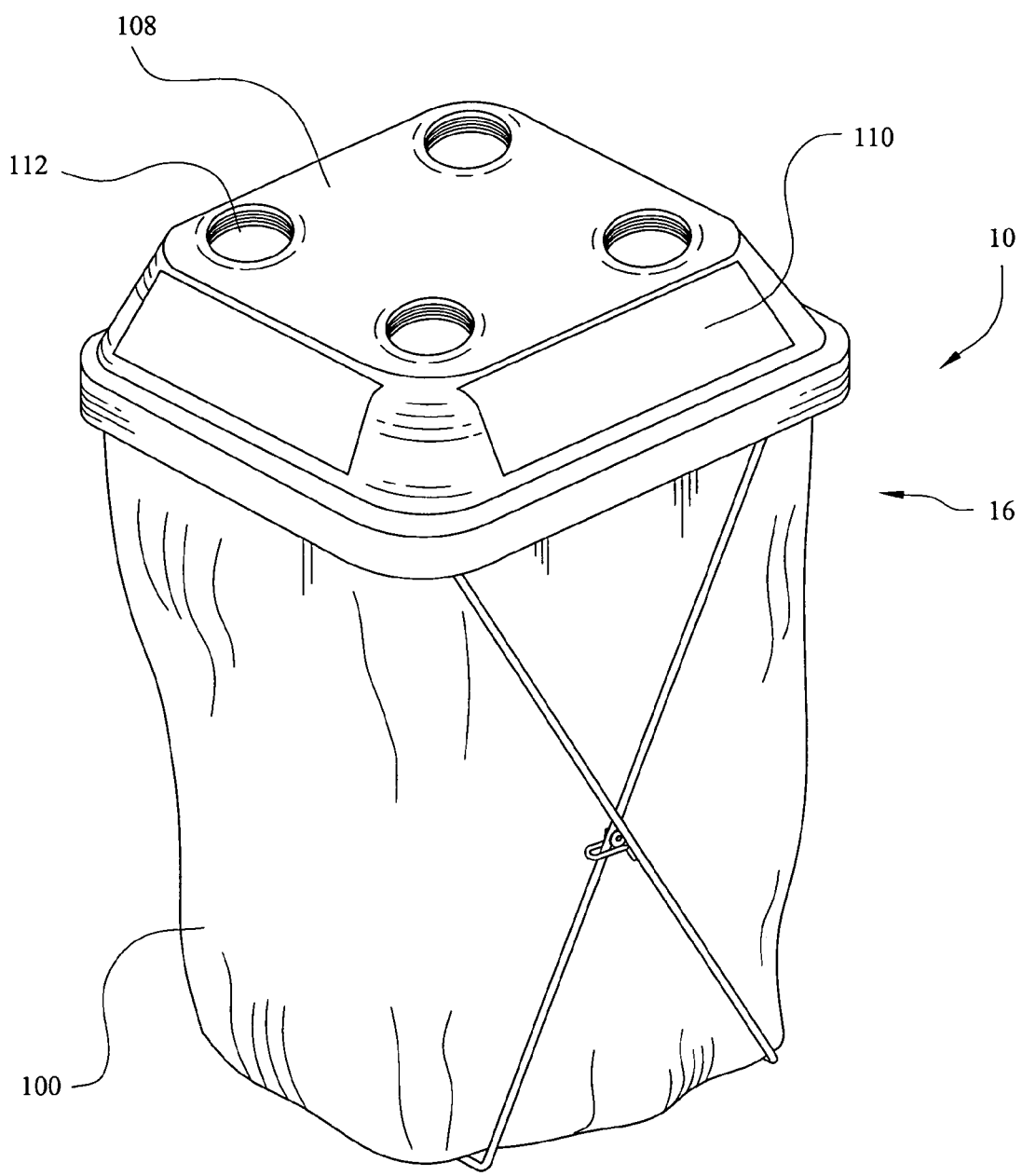
FIG. 7 is a perspective view of the first embodiment supporting a bag and covered by a cover.
Figure 8:
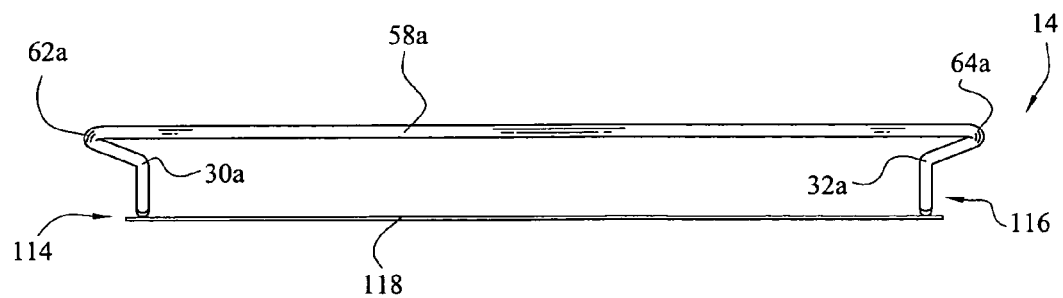
FIG. 8 is a top view of a second apparatus for supporting a bag during filling.
Figure 9:
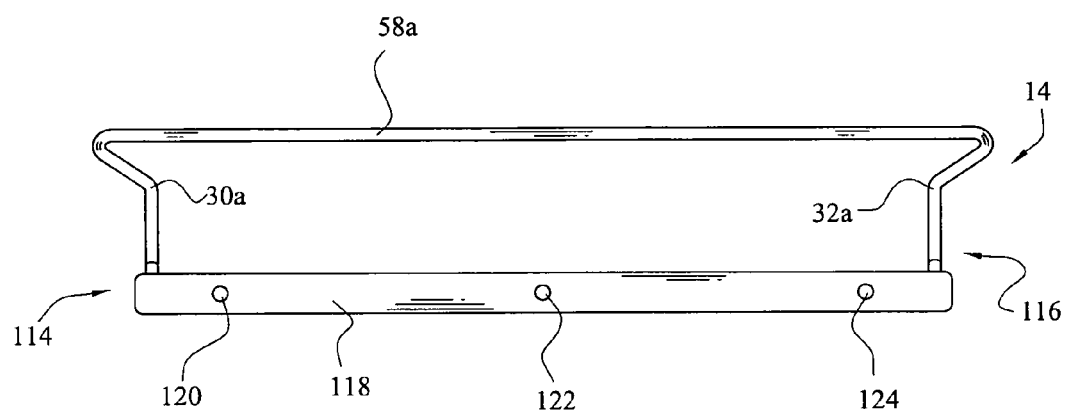
FIG. 9 is a front view of the second apparatus.
Figure 10:
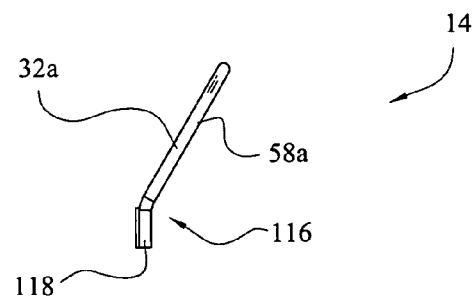
FIG. 10 is a right side view of the second apparatus.

Referring to FIGS. 1–7, the invention provides a bag stand, or first apparatus, 10 having first and second legs 16, 18 pivotable with respect one another about a pivot axis 20. The first and second legs 16, 18 pivot between a first position and a second position. In the first position, the first and second legs 16, 18 are substantially aligned with respect to one another and can be stored. In the second position, the first and second legs 16, 18 are transverse with respect to one another and can receive a bag. Each of the legs 16, 18 can be formed from metal or molded plastic or wood. FIGS. 1–7 show the bag stand 10 in the second position. In the exemplary embodiment, the legs 16, 18 of the bag stand 10 are formed from bended metal rod stock, three-eights inch gauge steel. The size of the legs 16, 18 can be varied in view of the expected loading of the bag stand or other factors such as cost.

The apparatus 10, 12, 14 also includes first and second incurvate portions 22, 24, 26, 28 defined by each of the first and second legs 16, 18. The incurvate portions 22, 24, 26, 28 respectively curve inward from adjacent straight portions 38, 40, 42, 44 of the legs 16, 18. The first and second incurvate portions 22, 24, 26, 28 are spaced from the pivot axis 20 and from each other. The exemplary embodiment of the bag stand 10 includes first and second incurvate portions 22, 24, 26, 28 disposed generally at a top 46 of the bag stand 10. A bag stand constructed according to an alternative embodiment of the invention could include first and second incurvate portions disposed generally at a bottom of the alternative bag stand, such as the bottom 48 of the bag stand 10, or both the bottom and the top.

The apparatus 10, 12, 14 also includes first and second excurvate portions 30, 32, 34, 36 defined by each of the first and second legs 16, 18. The excurvate portions 30, 32, 34, 36 respectively curve outward with respect to the straight portions 38, 40, 42, 44 and the incurvate portions 22, 24, 26, 28 of the legs 16, 18. The first and second excurvate portions 30, 32, 34, 36 are substantially coplanar with the first and second incurvate portions 22, 24, 26, 28 of the respective leg 16, 18 and are spaced from said pivot axis 20 and from each other. An opening of a bag can be received at the first and second excurvate portions 30, 32, 34, 36 of each respective leg 16, 18 and supported during filling. A method for attaching a bag to the bag stand 10 is set forth below.

In the exemplary embodiment of the invention, each of the legs 16, 18 of the bag stand 10 a substantially rectangular frame 50, 52, respectively. The substantially rectangular frame 50 includes a frame member 54 and a bail 58. The substantially rectangular frame 52 includes a frame member 56 and a bail 60. The frame member 54 includes the straight portions 38, 40 and the frame member 56 includes the straight portions 42, 44. The first and second incurvate portions 22, 24 are defined by the frame member 54. The first and second incurvate portions 26, 28 are defined by the frame member 56. The first and second excurvate portions 30, 32 are defined between the frame member 54 and the bail 60. The first and second excurvate portions 34, 36 are defined between the frame member 56 and the bail 60, in other words, an intersection between the frame member 56 and the bail 60. The frame members 54, 56 are fixedly connected to the bails 58, 60, respectively. In the exemplary embodiment, the frame members 54, 56 are welded to the bails 58, 60, respectively. A bag stand constructed according to an alternative embodiment of the invention could include a substantially rectangular frame having a frame member and bail integral with one another or a substantially rectangular frame having a frame member and bail releasibly engaged with one another.

In the exemplary embodiment, the first and second excurvate portions 30, 32, 34, 36 are spaced further from the pivot axis 20 relative to the first and second incurvate portions 22, 24, 26, 28. Adjacent pairs of incurvate portions 22, 24, 26, 28 and excurvate portions 30, 32, 34, 36 cooperate to form pockets or notches in the bag stand 10 to receive a bag and support the bag during filling. The first incurvate portion 22, 26 of each of the first and second legs 16, 18 is disposed adjacent to the first excurvate portion 30, 34 of the respective leg 16, 18. The second incurvate portion 24, 28 of each of the first and second legs 16, 18 is disposed adjacent to the second excurvate portion 32, 36 of the respective leg 16, 18. Adjacent pairs incurvate and excurvate portions, 22 and 30, 24 and 32, 26 and 34, 28 and 36, extend in a plane substantially parallel to the pivot axis 20. In the exemplary embodiment of the invention, the pairs incurvate and excurvate portions, 22 and 30, 24 and 32, 26 and 34, 28 and 36, extend in a plane that is not perfectly parallel to the pivot axis 20 because of the construction of the frame members 54, 56 and respective bails 58, 60. However, the pairs incurvate and excurvate portions, 22 and 30, 24 and 32, 26 and 34, 28 and 36, could extend in a plane that is perfectly parallel to the pivot axis 20 in a bag stand constructed according to an alternative embodiment of the invention, such as a bag stand having a substantially rectangular frame with a frame member and bail integral with one another.

In the exemplary embodiment, the first and second incurvate portions 22, 24, 26, 28 of each of said first and second legs 16, 18 extend toward one another. For example, the first and second incurvate portions 22, 24 extend toward one another and the first and second incurvate portions 26, 28 extend toward one another. Similarly, the first and second excurvate portions 30, 32, 34, 36 of each of said first and second legs 16, 18 extend away one another. For example, the first and second-excurvate portions 30, 32 extend away one another and the first and second excurvate portions 34, 36 extend away one another.

The exemplary embodiment of the apparatus 10 includes third and fourth incurvate portions 62, 64, 66, 68 defined by each of the first and second legs 16, 18. The third and fourth incurvate portions 62, 64, 66, 68 are spaced from the pivot axis 20 and from each other. The third and fourth incurvate portions 62, 64 are defined by the bail 58 and the third and fourth incurvate portions 66, 68 are defined by the bail 60. The first and second excurvate portions 30, 32, 34, 36 of each of the first and second legs 16, 18 are individually disposed between the first and second incurvate portions 30, 32, 34, 36 and said third and fourth incurvate portions 62, 64, 66, 68. For example, the first excurvate portion 30 is disposed between the first incurvate portion 22 and the third incurvate portion 62; the second excurvate portion 32 is disposed between the second incurvate portion 24 and the fourth incurvate portion 64; the first excurvate portion 34 is disposed between the first incurvate portion 26 and the third incurvate portion 66; the second excurvate portion 36 is disposed between the second incurvate portion 28 and the fourth incurvate portion 68. The third and fourth incurvate portions 62, 64, 66, 68 and the first and second incurvate portions 22, 24, 26, 28 and the first and second excurvate portions 30, 32, 34, 36 of each of the first and second legs 16, 18 are substantially coplanar with one another. The first and second incurvate portions 22, 24, 26, 28 and the first and second excurvate portions 30, 32, 34, 36 and the third and fourth incurvate portions 62, 64, 66, 68 are defined in planes parallel to one another. In alternative embodiments of the bag stand 10, the third and fourth incurvate portions 62, 64, 66, 68 and the first and second incurvate portions 22, 24, 26, 28 and the first and second excurvate portions 30, 32, 34, 36 of each of the first and second legs 16, 18 could be perfectly coplanar with one another.

The exemplary bag stand 10 includes first and second elongate members 70, 72 individually extending between the first and second excurvate portions 30, 32, 34, 36 defined by each of the first and second legs 16, 18. For example, the first elongate member 70 extends between the first and second excurvate portions 30, 32 and the second elongate member 72 extends between the first and second excurvate portions 34, 36. The frame members 54 and 56 include the first and second elongate members 70, 72, respectively. The bails 58, 60 and first and second elongate members 70, 72 cooperate to form apertures 74, 76. An opening of a bag can be moved through the apertures when a bag is Alternative embodiments of the bag stand 10 can include frame members without first and second elongate members.

The exemplary bag stand 10 includes first and second hinge members 78, 80 pivotally engaging the first and second legs 16, 18. For clarity, the structure of the first hinge member 78 will be described in detail, however each of the first and second hinge members 78, 80 are constructed similarly and are mirror images of one another. The first hinge member 78 includes an elongate wire member 82 fixedly engaged with one of the first and second legs 16, 18 and substantially encircling the other of the first and second legs 16, 18. In the exemplary embodiment, the elongate wire member 82 is fixedly engaged with the first leg 16 and substantially encircles the second leg 18. A first end 84 of the elongate wire member 82 is welded to the first leg 16. Both hinge members 78, 80 are fixedly associated with the same leg 16, 18. The elongate wire member 82 extends a length to a second end 86. The second end 86 can also be fixedly associated with the first leg 16. Portions 88, 90 of the elongate wire member 82 extend parallel to one another and cooperate to define a path 96 of movement of the second leg 18. A arcuate portion 92 of the elongate wire member 82 is disposed between the portions 88, 90. The arcuate portion 92 defines a limit of travel of the second leg 18 along the path 96. A portion 94 of the elongate wire member 82 is disposed between the second end 86 and the portion 90. The portion 94 extends transverse to the portions 88, 90 in a plane parallel to the plane of the portions 88, 90.

The first hinge member 78 also includes a washer member 98 rotatably encircling the elongate wire member 82. The washer member 98 is fixedly associated with the other of the first and second legs 16, 18. In the exemplary embodiment, the washer member 98 is fixedly engaged with the second leg 18. The washer member 98 is disposed between the first and second legs 16, 18 and encircles the portion 94 adjacent the second end 86. During movement of the first and second legs 16, 18 relative to one another from the second position, shown in FIGS. 1–7, to the first position, the washer member 98 and second leg 18 concurrently rotate along the path 96 about the portion 94.

In operation, the bag stand 10 can be retrieved from storage in the first position and moved to the second position. The second leg 18 and washer member 98 are rotated about the portion 94 along the path 96 until the second leg 18 contacts the arcuate portion 92. An open end of a bag 100 can be moved through the aperture 74 in the direction 102, from inside the bag stand 10 to the outside of the bag stand 10. The open end of the bag 100 can be pulled over and around the bail 58 and over the third and fourth incurvate portions 62, 64, along path 126. The open end of the bag 100 is pulled to rest in first and second excurvate portions 30, 32. To enhance the engagement between the bag 100 and the bag stand 10, it is desirable to pull the bag 100 from a portion of the bag 100 inside the bag stand 10, the results best shown in FIG. 6. A similar process is followed to engage the open end of the bag 100 and the bail 60 with respect to one another. The bag 100 can be fabricated from any suitable material and have any suitable dimension. The exemplary bag 100 is a sixty gallon, 1.25 mil plastic bag.

To enhance the stability of the bag stand 10 during filling of the bag 100, one or more anchors 102 for securing the bottom 48 of the bag stand 10 to the ground. The anchor 102 includes a hook portion 104 that engages the bag stand 10 and stake portion 106 extending from the hook portion. At least the stake portion can be driven into the ground and the hook portion may also be driven into the ground.

To enhance the aesthetic appeal of the bag stand 10, a cover 108 can be sized to concurrently extend around the bails 58, 60. The cover 108 can display indicia 110. The indicia 110 can be integrally formed on the cover or connected to the cover, releasibly or fixedly. The cover 108 defines at least one aperture 112 for receiving refuse. The aperture 112 can be sized to correspond to a particular kind of refuse, such as a can or bottle. A plurality of spaced apertures 112 can extend through the cover 108 for permitting multiple aluminum cans, glass bottles or other recyclable to be simultaneously inserted into the bag 100.

The application also provides an apparatus 14 having a bail 58a extending a length between a first and second ends 114, 116. The bail 58a defines first and second incurvate portions 62a, 64a spaced from each other. The bail 58a also defines first and second excurvate portions 30a, 32a coplanar with the first and second incurvate portions 62a, 64a. The first and second excurvate portions 30a, 32a are spaced from each other. The apparatus 14 also includes a frame member 118 fixedly engaged with the bail 58a and defining a plurality of apertures 120, 122, 124. Fasteners, such bolts and/or screws, can be inserted in the plurality of apertures 120, 122, 124 to connect the frame member 118 and bail 58a to another structure, such as a refuse can. The process for engaging a bag to the bail 58a would be the same as the process set forth above relative to the bail 58.

The bail 58a could be integrally combined with the frame members 54, replacing the bail 58. In such an embodiment, the invention would include first and second legs pivotally engaged with one anther like legs 16, 18. In this proposed alternative embodiment, the first and second incurvate portions 62a, 64a would be spaced further from the pivot axis of the embodiment relative to the first and second excurvate portions 30a, 32a. In other words, the alternative embodiment would not defined incurvate portions between the first and second excurvate portions 30a, 32a and the pivot axis. In the exemplary embodiment, on the other hand, the first and second incurvate portions 22, 24 are disposed between the excurvate portions 30, 32, respectively, and the pivot axis 20.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:
   first and second legs pivotable with respect one another about a pivot axis between a first position wherein said first and second legs are substantially aligned with respect to one another and a second position wherein said first and second legs are transverse with respect to one another;
   first and second incurvate portions defined by each of said first and second legs and spaced from said pivot axis and from each other; and
   first and second excurvate portions defined by each of said first and second legs and substantially coplanar with said first and second incurvate portions of said respective leg and spaced from said pivot axis and from each other, wherein adjacent incurvate and excurvate portions extend in a plane substantially parallel to said pivot axis.

2. The apparatus of claim 1 wherein said first and second excurvate portions are spaced further from said pivot axis relative to said first and second incurvate portions.

3. The apparatus of claim 1 wherein each of said first and second legs defines a substantially rectangular frame.

4. The apparatus of claim 3 wherein said substantially rectangular frame includes a frame member and a bail.

5. The apparatus of claim 4 wherein said first and second excurvate portions are defined between said frame member and said bail.

6. The apparatus of claim 5 wherein said frame member and said bail are one of fixedly connected to one another and integral.

7. The apparatus of claim 5 further comprising:
   an aperture defined between said bail and said frame member.

8. The apparatus of claim 1 wherein said first incurvate portion of each of said first and second legs is disposed adjacent to said first excurvate portion of said respective leg and said second incurvate portion of each of said first and second legs is disposed adjacent to said second excurvate portion of said respective leg.

9. The apparatus of claim 8 wherein said first and second incurvate portions of each of said first and second legs extend toward one another.

10. The apparatus of claim 9 wherein said first and second excurvate portions of each of said first and second legs extend away one another.

11. The apparatus of claim 1 further comprising:
    first and second elongate members individually extending between said first and second excurvate portions defined by each of said first and second legs.

12. The apparatus of claim 1 further comprising:
    third and fourth incurvate portions defined by each of said first and second legs and spaced from said pivot axis and from each other.

13. The apparatus of claim 12 wherein said third and fourth incurvate portions and said first and second incurvate portions and said first and second excurvate portions of each of said first and second legs are coplanar with one another.

14. The apparatus of claim 12 wherein said first and second excurvate portions of each of said first and second legs are individually disposed between said first and third incurvate portions and said second and fourth incurvate portions respectively.

15. An apparatus comprising:
    first and second legs pivotable with respect one another about a pivot axis between a first position wherein said first and second legs are substantially aligned with respect to one another and a second position wherein said first and second legs are transverse with respect to one another, wherein each of said first and second legs defines a substantially rectangular frame including a frame member and a bail fixedly associated with one another and defining an aperture;
    first and second incurvate portions defined by each of said first and second legs and spaced from said pivot axis and from each other wherein said first and second incurvate portions are defined by said frame member; and
    first and second excurvate portions defined by each of said first and second legs and substantially coplanar with said first and second incurvate portions of said respective leg and spaced from said pivot axis and from each other wherein said first and second excurvate portions are defined at an intersection of said frame member and said bail.

16. The apparatus of claim 15 further comprising:
    a cover releasibly engageable with respect to both of said bails and defining a second aperture.

17. The apparatus of claim 15 wherein said frame member and said bail of each of said first and second legs are welded together.

18. The apparatus of claim 15 said frame member of each leg defines an elongate member extending between said first and second excurvate portions, said aperture defined by said bail and said elongate member.

19. The apparatus of claim 15 further comprising:
    third and fourth incurvate portions defined by said bail.

20. The apparatus of claim 19 wherein said first and second incurvate portions and said first and second excurvate portions and said third and fourth incurvate portions are substantially coplanar.

21. The apparatus of claim 15 further comprising:
    first and second hinge members pivotally engaging said first and second legs.

22. An apparatus comprising:
    first and second legs pivotable with respect one another about a pivot axis between a first position wherein said first and second legs are substantially aligned with respect to one another and a second position wherein said first and second legs are transverse with respect to one another, wherein each of said first and second legs defines a substantially rectangular frame including a frame member and a bail fixedly associated with one another and defining an aperture;
    first and second incurvate portions defined by each of said first and second legs and spaced from said pivot axis and from each other wherein said first and second incurvate portions are defined by said frame member;
    first and second excurvate portions defined by each of said first and second legs and substantially coplanar with said first and second incurvate portions of said respective leg and spaced from said pivot axis and from each other wherein said first and second excurvate portions are defined at an intersection of said frame member and said bail; and
    first and second hinge members pivotally engaging said first and second legs, wherein each of said first and second hinge members further comprise:
    an elongate wire member fixedly engaged with one of said first and second legs and substantially encircling the other of said first and second legs; and a washer member rotatably encircling said elongate wire member and fixedly associated with said other of said first and second legs.

23. An apparatus comprising:

first and second legs pivotable with respect one another about a pivot axis between a first position wherein said first and second legs are substantially aligned with respect to one another and a second position wherein said first and second legs are transverse with respect to one another; and first and second hinge members pivotally engaging said first and second legs including an elongate wire member fixedly engaged with one of said first and second legs and substantially encircling the other of said first and second legs and a washer member rotatably encircling said elongate wire member and fixedly associated with said other of said first and second legs.

* * * * *